(12) United States Patent
Liu et al.

(10) Patent No.: US 12,434,211 B2
(45) Date of Patent: Oct. 7, 2025

(54) EFFICIENT AND COST-EFFECTIVE METHOD FOR PREPARING ULTRA-FINE POWDERED NATURAL RUBBER MASTERBATCH WITH HIGH GRAPHENE CONTENT AND USE THEREOF

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Guizhe Zhao, Taiyuan (CN); Xu Li, Taiyuan (CN)

(73) Assignees: NORTH UNIVERSITY OF CHINA, Taiyuan (CN); SHANXI ZHONGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 368 days.

(21) Appl. No.: 18/327,801

(22) Filed: Jun. 1, 2023

(65) Prior Publication Data
US 2023/0321620 A1    Oct. 12, 2023

Related U.S. Application Data

(63) Continuation of application No. PCT/CN2023/088597, filed on Apr. 17, 2023.

(30) Foreign Application Priority Data

Mar. 27, 2023    (CN) .......................... 202310300813.1

(51) Int. Cl.
*B01J 2/06*    (2006.01)

(52) U.S. Cl.
CPC ...................................... *B01J 2/06* (2013.01)

(58) Field of Classification Search
CPC .......................................................... B01J 2/06
USPC ............................................................ 264/12
See application file for complete search history.

(56) References Cited

U.S. PATENT DOCUMENTS

2022/0289934 A1*   9/2022   Liu ............................ C08J 3/22

FOREIGN PATENT DOCUMENTS

| CN | 107022119 A | * | 8/2017 | ............... C08K 7/26 |
| CN | 114773642 A |   | 7/2022 |                          |

OTHER PUBLICATIONS

Chemical Engineering Program, Natural Rubber Powder Production of Latex, pp. 1-2 (Year: 2018).*

* cited by examiner

*Primary Examiner* — Deve V Hall

(57) ABSTRACT

A method for preparing a graphene-containing ultra-fine powdered natural rubber masterbatch, including: mixing a diluted graphene oxide dispersion with an anionic surfactant to obtain a modified graphene oxide dispersion; mixing the modified graphene oxide dispersion with a natural rubber latex suspension to obtain a mixed emulsion; and subjecting the mixed emulsion to spray drying to obtain the ultra-fine powdered natural rubber masterbatch with a particle size of less than 5 µm. This application further provides a method for preparing a graphene-modified natural rubber nanocomposite, including: mixing the ultra-fine powdered natural rubber masterbatch with natural rubber block, and carbon black.

10 Claims, 3 Drawing Sheets

EFFICIENT AND COST-EFFECTIVE METHOD FOR PREPARING ULTRA-FINE POWDERED NATURAL RUBBER MASTERBATCH WITH HIGH GRAPHENE CONTENT AND USE THEREOF

CROSS-REFERENCE TO RELATED APPLICATIONS

This application is a continuation of International Patent Application No. PCT/CN2023/088597, filed on Apr. 17, 2023, which claims the benefit of priority from Chinese Patent Application No. 202310300813.1, filed on Mar. 27, 2023. The content of the aforementioned application, including any intervening amendments thereto, is incorporated herein by reference in its entirety.

TECHNICAL FIELD

This application relates to functional rubber composites, and more particularly to a method for preparing an ultra-fine powdered natural rubber masterbatch with high graphene content and a use thereof.

BACKGROUND

As an indispensable part of modern vehicles, tires are mainly made of rubber. Natural rubber (NR) is readily-available, low-cost, and has excellent elasticity and insulation properties. Especially, the typical self-reinforcing effect makes natural rubber an essential matrix material, which has been widely used in the manufacturing of engineering tires, e.g., truck tires and tires of tank loading wheels. However, natural rubber is a polymer material, and under long-term exposure to dynamic stress, the hysteresis phenomenon caused by its intrinsic viscoelasticity will lead to the transformation of the mechanical energy applied to the material system into internal heat, attenuating the rubber performance and ultimately resulting in the performance loss. Currently, the commonly-used method to improve the performance of natural rubber composites is to introduce nano-fillers, such as nano-carbon black, carbon nanotubes, nano-montmorillonite, and graphene.

Graphene is an emerging material with a single-layer two-dimensional (2D) honeycomb lattice structure formed by closely-packed $sp^2$-hybridized carbon atoms, and has promising application prospects in materials, micro-nano processing, energy, biomedicine, and drug delivery, and is considered as a revolutionary material due to its excellent optical, electrical, and mechanical properties. Graphene oxide (GO) is a typical 2D material possessing abundant oxygen-containing functional groups, which is obtained by oxidizing graphite through physical and chemical approaches.

Graphene and its derivatives have been widely used in rubber reinforcement and modification to prepare rubber composites with enhanced mechanical strength, toughness, and thermal conductivity due to their excellent mechanical strength, electrical conductivity, and thermal conductivity. However, for the existing latex co-agglomeration method for preparing the graphene-modified natural rubber composites, the dehydration and drying process will lead to a prolonged production cycle and increased energy consumption. In addition, the existing latex co-agglomeration method is less cost-effective, thereby restricting the application of graphene-modified natural rubber composites in tires.

As cited in British standard "BS2955:1993", rubber particles with a particle size less than 1 mm can be defined as powdered rubber. Compared with block rubber and sheet rubber, the powdered rubber has many advantages in both processing and application. In terms of the rubber processing, the powdered rubber has short mixing time, low power consumption, low rubber discharging temperature, and uniform dispersion. In addition, the powdered rubber can also be transported by pipeline and automatically weighed like carbon black and other fillers, thereby facilitating enhancing the automation of mixing procedure. The powdered rubber has a wider application range. For instance, it can not only be employed in the preparation of rubber products, but also act as a modifier for adhesives and polymers. Recently, the ultra-fine powdered rubber with a particle size less than 0.5 mm has attracted considerable attention.

SUMMARY

An objective of this application is to provide a method for preparing an ultra-fine powdered natural rubber masterbatch with high graphene content and a use thereof. In this application, the high-graphene content ultra-fine powdered natural rubber masterbatch with a particle size of less than 5 μm is obtained by using a spray drying method (suitable for industrial production), and then the high-graphene content ultra-fine powdered natural rubber masterbatch is mixed with natural rubber block and carbon black by mechanical blending to prepare a graphene-modified natural rubber nanocomposite, which can be used for the tire manufacturing.

Technical solutions of this application will be specifically described below.

In a first aspect, this application provides a method for preparing a graphene-containing ultra-fine powdered natural rubber masterbatch, including:

(1) adding deionized water to a graphene oxide dispersion, followed by an ultrasonic dispersion, adding of an anionic surfactant and mechanical stirring to obtain a modified graphene oxide dispersion;

(2) adding deionized water to a natural rubber latex, followed by a uniform mixing to obtain a latex suspension; slowly adding the latex suspension to the modified graphene oxide dispersion under a mechanical stirring followed by mixing under stirring to obtain a mixed emulsion; and (3) feeding the mixed emulsion into a spray dryer through a feeding pump, followed by spray drying to obtain the graphene-containing ultra-fine powdered natural rubber masterbatch with a particle size of less than 5 μm.

In an embodiment, in step (1), the anionic surfactant is selected from the group consisting of anionic polyacrylamide (APAM), fatty acid salt, sulfonate, sulfate ester salt, phosphate ester salt, and a combination thereof.

In an embodiment, in step (1), the deionized water is added to the graphene oxide dispersion to reach a graphene oxide concentration of 1~5 mg/mL;
the ultrasonic dispersion is performed at a power of 100-300 W for 10-30 min;
a mass ratio of graphene oxide in the graphene oxide dispersion to the anionic surfactant is (3~7):1; and
the mechanical stirring is performed at 300-700 r/min for 10-30 min.

In an embodiment, in step (2), a concentration of latex in the latex suspension is 10-30 wt. %; the mechanical stirring is performed at 300~700 r/min; a mass ratio of the latex in the latex suspension to graphene oxide in the graphene oxide dispersion in step (1) is 100:(20-50); and the mixing under stirring is performed for 5-30 min.

In an embodiment, in step (3), a feeding rate of the feeding pump is 10-50 mL/min; and an inlet air temperature of the spray dryer is 80-120° C., and an outlet air temperature of the spray dryer is 50-80° C.

In a second aspect, this application provides a method for preparing a graphene-modified natural rubber nanocomposite, including:
- (a) preparing a graphene-containing ultra-fine powdered natural rubber masterbatch by using the method mentioned above; and
- (b) preparing the graphene-modified natural rubber nanocomposite from the graphene-containing ultra-fine powdered natural rubber masterbatch.

In an embodiment, wherein the step (b) includes:
- (b1) adding the graphene oxide-containing ultra-fine powdered natural rubber masterbatch and a raw natural rubber block to an internal mixer, followed by an internal mixing to obtain a first rubber mixture; wherein during the internal mixing, an anti-aging agent, an antioxidant, an activator, and a reinforcing filler are sequentially added to the internal mixer;
- (b2) transferring the first rubber mixture to double rollers of an open mill, followed by refining and mixing with an accelerator and a vulcanizing agent and milling until there are no air bubbles, so as to obtain a second rubber mixture; and
- (b3) subjecting the second rubber mixture to standing followed by vulcanization to obtain the graphene-modified natural rubber nanocomposite.

In an embodiment, a mass ratio of the graphene oxide-containing ultra-fine powdered natural rubber masterbatch to the raw natural rubber block to the anti-aging agent to the antioxidant to the activator to the accelerator to the vulcanizing agent to the reinforcing filler is (1.5~3):(97.5~99):1:1:5:2:2:(50~80); and in step (b1), the internal mixing is performed at 100~120° C. for 10~20 min.

In an embodiment, in step (b2), the mixing is performed at 50-70° C.

In an embodiment, in step (b3), the standing is performed for 18-36 h; and the vulcanization is performed at 140~160° C. and 10~30 MPa for 10~30 min.

Compared with the prior art, this application has the following beneficial effects.

(1) Compared to the conventional dewatering drying process, the spray drying adopted herein for the preparation of graphene-modified natural rubber masterbatch has less time and energy consumption, and can greatly shorten production period, effectively reducing the production cost and improving the production efficiency. In conclusion, this application provides a new idea for the use of graphene-modified natural rubber nanocomposites in tire industry, and facilitates the green manufacturing of tires.

(2) By means of the spray drying, the preparation method provided herein significantly reduces dust pollution and energy consumption, which is suitable for the green production of tires. Additionally, the method provided herein has continuous operation and low labor intensity, thereby significantly reducing the production cost. Therefore, this application has bright industrialization prospects.

(3) The ultra-fine powdered natural rubber masterbatch preparation method provided herein has simple operation, mild reaction conditions, and readily-available equipment, and is thus suitable for industrial production.

(4) The high-graphene content ultra-fine powdered natural rubber masterbatch prepared herein can be directly added to the raw natural rubber block through a conventional process, thereby facilitating the preparation of graphene-modified natural rubber nanocomposites for high-quality tires.

BRIEF DESCRIPTION OF THE DRAWINGS

The accompanying drawings are incorporated in and constitute a part of the description, illustrating embodiments of this application to explain the technical principles of this application.

The drawings needed in the description of the embodiments of this application or the prior art will be briefly described below to illustrate the technical solutions in the embodiments of this application or the prior art more clearly. Obviously, it should be understood by those skilled in the art that other accompanying drawings can be obtained based on the accompanying drawings provided herein without paying creative efforts.

DETAILED DESCRIPTION OF EMBODIMENTS

Figure 1:
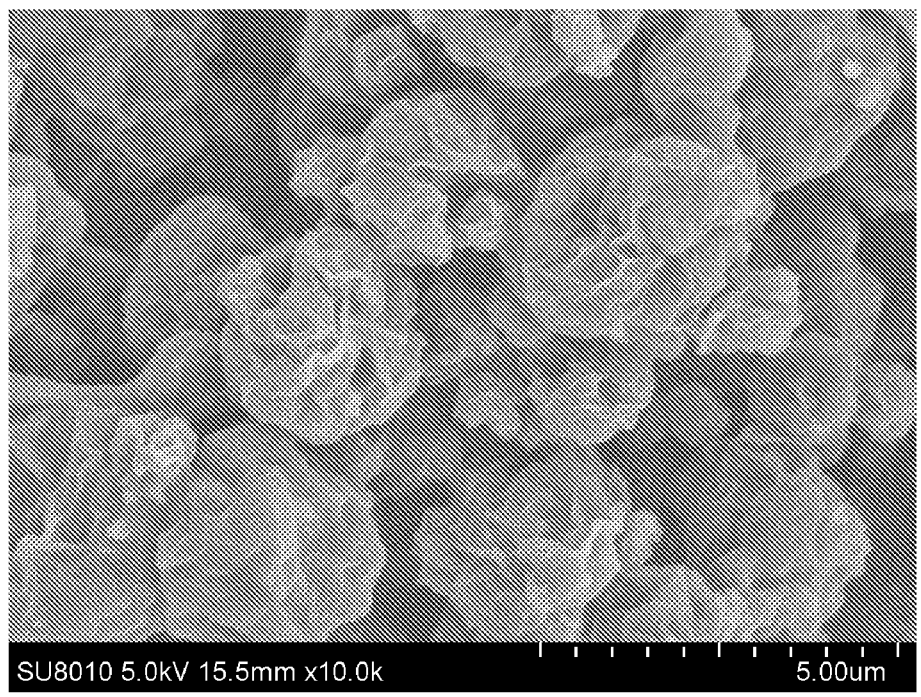
FIG. 1 is a scanning electron microscope (SEM) image of high-graphene content ultra-fine powdered natural rubber masterbatch prepared in Example 1 of this application.

The technical solutions of this application will be described clearly and completely below with reference to the embodiments. It should be noted that the embodiments in this application and the features in the embodiments can be combined with each other without contradiction.

Described below illustrate specific details of this application to facilitate the understanding of this application. However, this application can also be implemented other ways than those described herein. Obviously, described below are merely some embodiments of this application, which are not intended to limit this application.

In a first aspect, this application provides a method for preparing a graphene-containing ultra-fine powdered natural rubber masterbatch, which is performed as follows.

(1) Deionized water is added to a graphene oxide dispersion and then subjected to ultrasonic dispersion, adding of an anionic surfactant and mechanical stirring to obtain a modified graphene oxide dispersion.

(2) Deionized water is added to a natural rubber latex and then subjected to a uniform mixing to obtain a latex suspension. The latex suspension is slowly added to the modified graphene oxide dispersion under a mechanical stirring and mixed under stirring to obtain a mixed emulsion; and (3) The uniformly-dispersed mixed emulsion is fed into a spray dryer through a feeding pump and then subjected to spray drying to obtain the graphene-containing ultra-fine powdered natural rubber masterbatch with a particle size of less than 5 μm.

In an embodiment, the anionic surfactant is selected from the group consisting of anionic polyacrylamide (APAM), fatty acid salt, sulfonate, sulfate ester salt, phosphate ester salt, and a combination thereof. The fatty acid salt includes higher fatty acid sylvite, higher fatty acid sodium salt, higher fatty acid ammonium salt and higher fatty acid triethanolamine salt. The sulfonate includes alkylbenzene sulfonate, α-olefin sulfonate, alkane sulfonate, petroleum sulfonate, alkylglycerol ether sulfonate. The sulfate ester salt includes fatty alcohol sulfate salt and secondary alkyl sulfate salt.

In an embodiment, in step (1), the deionized water is added to the graphene oxide dispersion to reach a graphene oxide concentration of 1~5 mg/mL; the ultrasonic dispersion is performed at a power of 100-300 W for 10-30 min; a mass ratio of graphene oxide in the graphene oxide dispersion to the anionic surfactant is (3~7):1; and the mechanical stirring is performed at 300-700 r/min for 10-30 min.

In an embodiment, in step (2), a concentration of latex in the latex suspension is 10-30 wt. %; the mechanical stirring is performed at 300~700 r/min; a mass ratio of the latex in the latex suspension to graphene oxide in the graphene oxide dispersion in step (1) is 100:(20-50); and the mixing under stirring is performed for 5-30 min.

In an embodiment, in step (3), a feeding rate of the feeding pump is 10-50 mL/min; and an inlet air temperature of the spray dryer is 80-120° C., and an outlet air temperature of the spray dryer is 50-80° C.

In a second aspect, provided herein is a method for preparing a graphene-modified natural rubber nanocomposite, which is performed as follows.
(a) A graphene-containing ultra-fine powdered natural rubber masterbatch is prepared by using the method mentioned above.
(b) The graphene-modified natural rubber nanocomposite is prepared from the graphene-containing ultra-fine powdered natural rubber masterbatch.

In an embodiment, the step (b) is performed as follows.
(b1) Graphene oxide-containing ultra-fine powdered natural rubber masterbatch and a raw natural rubber block are added to an internal mixer and then subjected to an internal mixing to obtain a first rubber mixture. During the internal mixing, an anti-aging agent, an antioxidant, an activator, and a reinforcing filler are sequentially added to the internal mixer.
(b2) The first rubber mixture is transferred to a double roller of an open mill and then subjected to refining and mixing with an accelerator and a vulcanizing agent and milling until there are no air bubbles, so as to obtain a second rubber mixture.
(b3) The second rubber compound is subjected to standing and vulcanization to obtain the graphene-modified natural rubber nanocomposite.

In an embodiment, a mass ratio of the graphene oxide-containing ultra-fine powdered natural rubber masterbatch to the raw natural rubber block to the anti-aging agent to the antioxidant to the activator to the accelerator to the vulcanizing agent to the reinforcing filler is (1.5~3):(97.5~99):1:1:5:2:2:(50~80). In step (b1), the internal mixing is performed at 100~120° C. for 10~20 min.

In an embodiment, in step (b2), the mixing is performed at 50-70° C.

In an embodiment, in step (b3), the standing is performed for 18-36 h; and the vulcanization is performed at 140~160° C. and 10~30 MPa for 10~30 min The embodiments of this application are described in detail below.

Example 1

Provided herein was a method for preparing a graphene-containing ultra-fine powdered natural rubber masterbatch, which was performed as follows.
(1) A graphene oxide (GO) dispersion (2000 g, a concentration of 10 mg/mL) was added with deionized water and then subjected to an ultrasonic dispersion at a power of 100 W for 10 min to obtain a GO aqueous dispersion with a concentration of 1 mg/mL. Then the GO aqueous dispersion was added with sodium dodecyl benzene sulfonate (SDBS) (a mass ratio of GO to SDBS was 7:1) and subjected to a continuous mechanical stirring at 300 r/min for 10 min to obtain a modified GO dispersion.
(2) A natural rubber latex solution (166.7 g, and solid content: 60% (by weight)) was diluted with deionized water into a natural rubber latex suspension with a solid content of 10%. Under mechanical stirring, the natural rubber latex suspension was added to the modified GO dispersion (with a GO concentration of 1 mg/mL) and the reaction system was subjected to a continuous stirring at 300 r/min and 25° C. for 10 min to obtain a mixed emulsion of natural rubber and modified GO, with a GO content of 20 parts per hundred (phr).
(3) The mixed emulsion of natural rubber and modified GO was pumped into a spray dryer through a feeding pump for spray drying to obtain the graphene-containing ultra-fine powdered natural rubber masterbatch with a particle size of less than 5 μm and a GO content of 20 phr (its SEM image was displayed in FIG. 1), where an inlet air temperature of the spray dryer was 80° C., an outlet air temperature was 50° C., and a flow rate of the feeding pump was 10 mL/min.

Example 2

Provided herein was a method for preparing a graphene-containing ultra-fine powdered natural rubber masterbatch, which was performed as follows.
(1) A graphene oxide (GO) dispersion (3000 g, a concentration of 10 mg/mL) was added with deionized water and then subjected to an ultrasonic dispersion at a power of 300 W for 30 min to obtain a GO aqueous dispersion with a concentration of 5 mg/mL. Then the GO aqueous dispersion was added with sodium dodecyl benzene sulfonate (SDBS) (a mass ratio of GO to SDBS was 5:1) and subjected to a continuous mechanical stirring at 300 r/min for 10 min to obtain a modified GO dispersion.
(2) A natural rubber latex solution (166.7 g, and solid content: 60% (by weight)) was diluted with deionized water into a natural rubber latex suspension with a solid content of 30%. Under mechanical stirring, the natural rubber latex suspension was added to the modified GO dispersion (with a GO concentration of 5 mg/mL), and the reaction system was subjected to a continuous stirring at 700 r/min and 25° C. for 30 min to obtain a mixed emulsion of natural rubber and modified GO, with a GO content of 30 parts per hundred (phr).
(3) The mixed emulsion of natural rubber and the modified GO prepared was pumped into a spray dryer through a feeding pump for spray drying to obtain the graphene-containing ultra-fine powdered natural rubber masterbatch with a particle size of less than 5 μm and a GO content of 30 phr (its SEM image was displayed in FIG. 2), where an inlet air temperature of the spray dryer was 110° C., an outlet air temperature was 70° C., and a flow rate of the feeding pump was 30 mL/min.

Example 3

Provided herein was a method for preparing a graphene-containing ultra-fine powdered natural rubber masterbatch, which was performed as follows.

(1) A graphene oxide (GO) dispersion (5000 g, a concentration of 10 mg/mL) was added with deionized water and then subjected to an ultrasonic dispersion at a power of 300 W for 30 min to obtain a GO aqueous dispersion with a concentration of 5 mg/mL. Then the GO aqueous dispersion was added with sodium dodecyl benzene sulfonate (SDBS) (a mass ratio of GO to SDBS was 3:1) and subjected to a continuous mechanical stirring at 700 r/min for 30 min to obtain a modified GO dispersion.

(2) A natural rubber latex solution (166.7 g, and solid content: 60% (by weight)) was diluted with deionized water into a natural rubber latex suspension with a solid content of 30%. Under mechanical stirring, the natural rubber latex suspension was added to the modified GO dispersion (with a GO concentration of 5 mg/mL) and the reaction system was subjected to a continuous stirring at 700 r/min and 25° C. for 30 min to obtain a mixed emulsion of natural rubber and modified GO with a GO content of 50 parts per hundred (phr).

(3) The mixed emulsion of natural rubber and the modified GO was pumped into a spray dryer through a feeding pump for spray drying to obtain the graphene-containing ultra-fine powdered natural rubber masterbatch with a particle size of less than 5 μm and a GO content of 50 phr (its SEM image was displayed in FIG. 3), where an inlet air temperature of the spray dryer was 120° C., an outlet air temperature was 80° C., and a flow rate in the feeding pump was 50 mL/min.

Example 4

Provided herein was a method for preparing a graphene-modified natural rubber nanocomposite with the graphene-containing ultra-fine powdered natural rubber masterbatch as raw material, which was performed as follows.

(1) 3 g of the graphene oxide-containing ultra-fine powdered natural rubber masterbatch prepared in Example 1 and 97.5 g of a raw natural rubber block were added to an internal mixer and then subjected to an internal mixing at 100° C. for 5 min. 1 g of N-isopropyl-N'-phenyl-1,4-phenylenediamine and 1 g of 2,2,4-trimethyl-1,2-dihydroquinoline were sequentially added to the internal mixer and mixed for 5 min and then 5 g of ZnO, 2 g of stearic acid, and 25 g of carbon black were sequentially added to the internal mixer and mixed for 5 min. After that, 25 g of carbon black was added, and the internal mixing was performed for another 5 min to obtain a first rubber mixture.

(2) The first rubber mixture was transferred to double rollers of an open mill, and refined at 50° C., then mixed with 2 g of N-(oxydiethylent)-2-benzothiazole sulfenamide (NOBS, as accelerator) and 2 g of sulfur, and subjected to a milling until there were no air bubbles, so as to obtain a second rubber mixture.

(3) The second rubber mixture was allowed to stand for 18 h and then vulcanized at 140° C. and 10 MPa on a vulcanizing press for 30 min to obtain the graphene-modified natural rubber nanocomposite.

Example 5

Provided herein was a method for preparing a graphene-modified natural rubber nanocomposite with the graphene-containing ultra-fine powdered natural rubber masterbatch as raw material, which was performed as follows.

(1) 2.17 g of the graphene oxide-containing ultra-fine powdered natural rubber masterbatch prepared in Example 2 and 98.33 g of a raw natural rubber block were added to an internal mixer and then subjected to an internal mixing at 110° C. for 5 min. 1 g of N-isopropyl-N'-phenyl-1,4-phenylenediamine and 1 g of 2,2,4-trimethyl-1,2-dihydroquinoline were sequentially added to the internal mixer for mixing and mixed for 5 min, and then 5 g of ZnO, 2 g of stearic acid, and 25 g of carbon black were sequentially added to the internal mixer and mixed for 5 min. After that, 25 g of carbon black was added, and the internal mixing was performed for another 5 min to obtain a first rubber mixture.

(2) The first rubber mixture was transferred to double rollers of an open mill and refined at 70° C., then mixed with 2 g of N-(oxydiethylent)-2-benzothiazole sulfenamide (NOBS, as accelerator) and 2 g of sulfur at 70° C., and subjected to a milling until there were no air bubbles, so as to obtain a second rubber mixture.

(3) The second rubber mixture was allowed to stand for 36 h and then vulcanized at 160° C. and 30 MPa on a vulcanizing press for 10 min to obtain the graphene-modified natural rubber nanocomposite.

Example 6

Provided herein was a method for preparing a graphene-modified natural rubber nanocomposite with the graphene-containing ultra-fine powdered natural rubber masterbatch as raw material, which was performed as follows.

(1) 1.5 g of the graphene oxide-containing ultra-fine powdered natural rubber masterbatch prepared in Example 3 and 99 g of a raw natural rubber block were added to an internal mixer and then subjected to an internal mixing at 120° C. for 5 min. 1 g of N-isopropyl-N'-phenyl-1,4-phenylenediamine, and 1 g of 2,2,4-trimethyl-1,2-dihydroquinoline were sequentially added to the internal mixer and mixed for 5 min, and then 5 g of ZnO, 2 g of stearic acid, and 25 g of carbon black were sequentially added to the internal mixer and mixed for 5 min. After that, 25 g of carbon black was added and the internal mixing was performed for another 5 min to obtain a first rubber mixture.

(2) The first rubber mixture was transferred to double rollers of an open mill and refined at 70° C., then mixed with 2 g of N-(oxydiethylent)-2-benzothiazole sulfenamide (NOBS, as accelerator) and 2 g of sulfur, and subjected to a milling until there were no air bubbles, so as to obtain a second rubber mixture.

(3) The second rubber mixture was allowed to stand for 36 h and then vulcanized at 160° C. and 30 MPa on a vulcanizing press for 20 min to obtain the graphene-modified natural rubber nanocomposite.

Comparative Example 1

Provided herein was a method for preparing a graphene-containing powdered natural rubber masterbatch without modifying graphene oxide, which was performed as follows.

(S1) A graphene oxide (GO) dispersion (2000 g, a concentration of 10 mg/mL) was added with deionized water and then subjected to an ultrasonic dispersion at a power of 100 W for 10 min to obtain a GO aqueous dispersion with a concentration of 1 mg/mL. Then the GO aqueous dispersion was subjected to a continuous mechanical stirring at 300 r/min for 10 min to obtain a GO dispersion.

(S2) A natural rubber latex solution (166.7 g, and solid content: 60% (by weight)) was diluted with deionized water into a natural rubber latex suspension with a solid content of 10%. Under mechanical stirring, the natural rubber latex suspension was added to the GO dispersion (with a GO concentration of 1 mg/mL) and the reaction system was subjected to a continuous stirring at 300 r/min and 25° C. for 10 min to obtain a mixed emulsion of natural rubber and GO with a GO content of 20 parts per hundred (phr).

(S3) The mixed emulsion of natural rubber and the GO was pumped into a spray dryer through a feeding pump for spray drying to obtain the powdered natural rubber masterbatch with a GO content of 20 phr, where an inlet air temperature of the spray dryer was 80° C., an outlet air temperature was 50° C., and a flow rate of the feeding pump was 10 mL/min.

Comparative Example 2

Provided herein was a method for preparing a graphene-modified natural rubber nanocomposite with the graphene-containing powdered natural rubber masterbatch without modifying graphene oxide as a raw material, which was performed as follows.

(1) 3 g of the powdered natural rubber masterbatch prepared in Comparative Example 1 and 97.5 g of a raw natural rubber block were added to an internal mixer and then subjected to an internal mixing at 100° C. for 5 min. 1 g of N-isopropyl-N'-phenyl-1,4-phenylenediamine and 1 g of 2,2,4-trimethyl-1,2-dihydroquinoline were sequentially added to the internal mixer and mixed for 5 min, and then 5 g of ZnO, 2 g of stearic acid, and 25 g of carbon black were sequentially added to the internal mixer and mixed for 5 min. After that, 25 g of carbon black was added and the internal mixing was performed for another 5 min to obtain a first rubber mixture.

(2) The first rubber mixture was transferred to double rollers of an open mill and refined at 50° C., then mixed with 2 g of N-(oxydiethylent)-2-benzothiazole sulfenamide (NOBS, as accelerator) and 2 g of sulfur and subjected to a milling until there were no air bubbles, so as to obtain a second rubber mixture.

(3) The second rubber mixture was allowed to stand for 18 h and then vulcanized at 140° C. and 10 MPa on a vulcanizing press for 30 min to obtain the graphene-modified natural rubber nanocomposite.

The formulations of Examples 1 to 3 and Comparative Example 1 were shown in Table 1. The formulations of Examples 4 to 6 and Comparative Example 2 were shown in Table 2. The test results of performances of graphene-modified natural rubber nanocomposites prepared in Examples 4 to 6 and Comparative Example 2 were demonstrated in Table 3.

TABLE 1

Formulations of Examples 1-3 and Comparative Example 1

| Samples | Comparative Example 1 | Example 1 | Example 2 | Example 3 |
|---|---|---|---|---|
| Graphene oxide/g | 20 | 20 | 30 | 40 |
| Natural rubber/g | 100 | 100 | 100 | 100 |

TABLE 2

Formulations of Examples 4-6 and Comparative Example 2

| Samples | | Comparative Example 2 | Example 4 | Example 5 | Example 6 |
|---|---|---|---|---|---|
| Graphene-containing powdered natural rubber masterbatch | Graphene/g | 0.50 | 0.50 | 0.50 | 0.50 |
| | Natural rubber/g | 2.50 | 2.50 | 1.67 | 1.00 |
| Natural rubber in composite/g | | 97.5 | 97.50 | 98.33 | 99.00 |
| Carbon black in composite/g | | 50.00 | 50.00 | 50.00 | 50.00 |

The graphene-modified natural rubber nanocomposites prepared in Examples 4-6 and Comparative Example 2 were tested for mechanical property, thermal property, heat build-up, abrasion property, and compression permanent deformation. According to the test standard ISO37-2005, the mechanical property test of each of the graphene-modified natural rubber nanocomposites prepared in Examples 4-6 and Comparative Example 2 was performed. The tensile strength was tested under a tensile rate of 500 mm/min, and the elongation at break was tested at a tearing speed of 500 mm/min. The test of thermal conductivity was performed according to the test standard GB/T3399. The heat build-up and the permanent compression deformation were tested according to the test standard ISO-4666. The abrasion property was tested according to the test standard GB/T9867-2008.

TABLE 3

Performance test results of graphene-modified natural rubber nanocomposites prepared in Examples 4-6 and Comparative Example 2

| | Comparative Example 2 | Example 4 | Example 5 | Example 6 |
|---|---|---|---|---|
| Tensile strength/MPa | 24.12 | 26.20 | 26.55 | 25.35 |
| Elongation at break/% | 390.21 | 390.30 | 420.90 | 388.50 |
| M100/MPa | 3.54 | 3.69 | 3.46 | 3.75 |
| M300/MPa | 17.76 | 19.11 | 17.37 | 18.31 |
| Tearing strength/(N/mm) | 75.34 | 89.58 | 95.96 | 79.38 |
| Hardness/HA | 64.00 | 65.50 | 65.00 | 64.00 |
| Thermal conductivity/(W/m · k) | 0.29 | 0.31 | 0.33 | 0.29 |

TABLE 3-continued

Performance test results of graphene-modified
natural rubber nanocomposites prepared in
Examples 4-6 and Comparative Example 2

|  | Comparative Example 2 | Example 4 | Example 5 | Example 6 |
|---|---|---|---|---|
| Heat build-up/° C. | 19.60 | 18.40 | 17.70 | 18.20 |
| Abrasion/(mm$^3$) | 64.3 | 55.00 | 49.00 | 58.00 |
| Permanent deformation/% | 2.67 | 2.57 | 2.57 | 2.42 |

It can be demonstrated from Table 3 that the graphene-modified natural rubber nanocomposites prepared according to the method provided herein were excellent on mechanical property, thermal property, heat build-up performance, abrasion resistance, and compression permanent deformation performance. Compared with Comparative Example 2, the graphene-modified natural rubber nanocomposite prepared by using the graphene-containing ultra-fine powdered natural rubber masterbatch in Example 4 had more excellent mechanical properties, heat conductivity, heat build-up performance, abrasion resistance, and permanent deformation properties.

Figure 2:
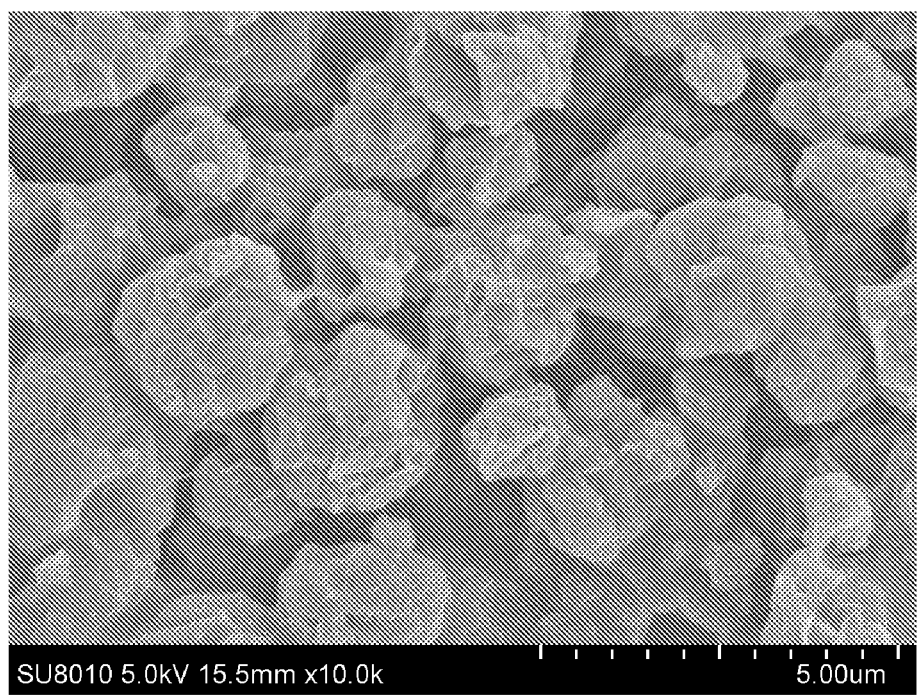
FIG. 2 is an SEM image of high-graphene content ultra-fine powdered natural rubber masterbatch prepared in Example 2 of this application.
Figure 3:
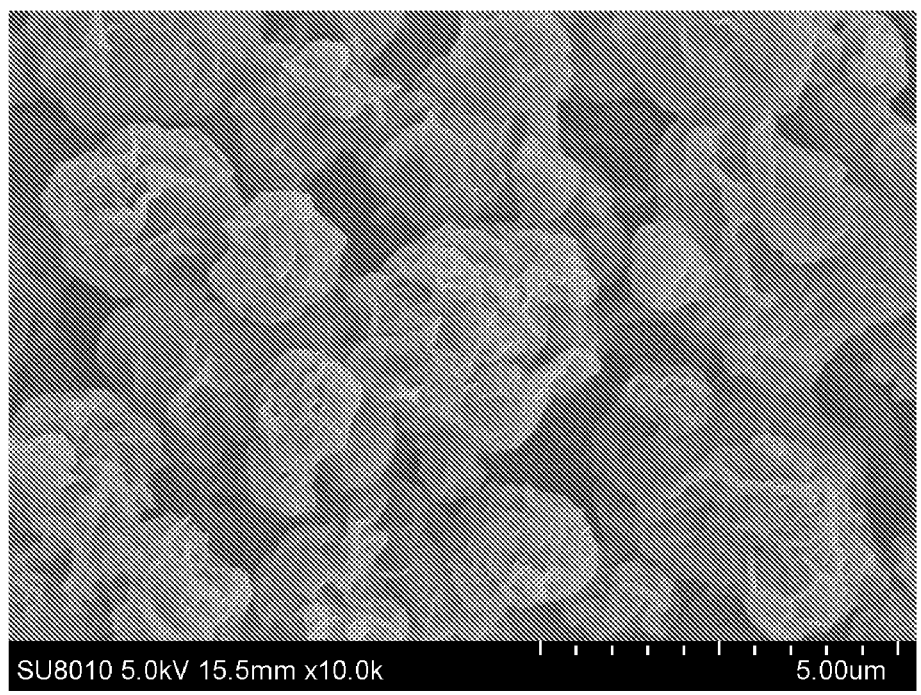
FIG. 3 is an SEM image of high-graphene content ultra-fine powdered natural rubber masterbatch prepared in Example 3 of this application.

As shown in FIGS. 1-3, the particle size of the graphene-containing powdered natural rubber masterbatch prepared by the method provided herein was less than 5 μm, which can be taken as ultra-fine powdered masterbatch.

Described above are merely illustrative of this application, and are intended to facilitate the understanding and implementation of this application. It should be understood that various modifications, and replacements made by those skilled in the art without departing from the spirit and scope of this application shall fall within the scope of this application defined by the appended claims.

What is claimed is:

1. A method for preparing a graphene-containing ultra-fine powdered natural rubber masterbatch, comprising:
   (1) adding deionized water to a graphene oxide dispersion, followed by an ultrasonic dispersion, adding of an anionic surfactant and mechanical stirring to obtain a modified graphene oxide dispersion;
   (2) adding deionized water to a natural rubber latex, followed by a uniform mixing to obtain a latex suspension; slowly adding the latex suspension to the modified graphene oxide dispersion under a mechanical stirring followed by mixing under stirring to obtain a mixed emulsion; and
   (3) feeding the mixed emulsion into a spray dryer through a feeding pump, followed by spray drying to obtain the graphene-containing ultra-fine powdered natural rubber masterbatch with a particle size of less than 5 μm.

2. The method of claim 1, wherein in step (1), the anionic surfactant is selected from the group consisting of anionic polyacrylamide (APAM), fatty acid salt, sulfonate, sulfate ester salt, phosphate ester salt, and a combination thereof.

3. The method of claim 1, wherein in step (1), the deionized water is added to the graphene oxide dispersion to reach a graphene oxide concentration of 1~5 mg/mL;
   the ultrasonic dispersion is performed at a power of 100-300 W for 10-30 min;
   a mass ratio of graphene oxide in the graphene oxide dispersion to the anionic surfactant is (3~7):1; and
   the mechanical stirring is performed at 300-700 r/min for 10-30 min.

4. The method of claim 1, wherein in step (2), a concentration of latex in the latex suspension is 10-30 wt. %; the mechanical stirring is performed at 300~700 r/min; a mass ratio of the latex in the latex suspension to graphene oxide in the graphene oxide dispersion in step (1) is 100:(20-50); and the mixing under stirring is performed for 5-30 min.

5. The method of claim 1, wherein in step (3), a feeding rate of the feeding pump is 10-50 mL/min; and an inlet air temperature of the spray dryer is 80-120° C., and an outlet air temperature of the spray dryer is 50-80° C.

6. A method for preparing a graphene-modified natural rubber nanocomposite, comprising:
   (a) preparing a graphene-containing ultra-fine powdered natural rubber masterbatch by using the method of claim 1; and
   (b) preparing the graphene-modified natural rubber nanocomposite from the graphene-containing ultra-fine powdered natural rubber masterbatch.

7. The method of claim 6, wherein the step (b) comprises:
   (b1) adding the graphene oxide-containing ultra-fine powdered natural rubber masterbatch and a raw natural rubber block to an internal mixer, followed by an internal mixing to obtain a first rubber mixture; wherein during the internal mixing, an anti-aging agent, an antioxidant, an activator, and a reinforcing filler are sequentially added to the internal mixer;
   (b2) transferring the first rubber mixture to double rollers of an open mill followed by refining and mixing with an accelerator and a vulcanizing agent and milling until there are no air bubbles, so as to obtain a second rubber mixture; and
   (b3) subjecting the second rubber mixture to standing followed by vulcanization to obtain the graphene-modified natural rubber nanocomposite.

8. The method of claim 7, wherein a mass ratio of the graphene oxide-containing ultra-fine powdered natural rubber masterbatch to the raw natural rubber block to the anti-aging agent to the antioxidant to the activator to the accelerator to the vulcanizing agent to the reinforcing filler is (1.5~3):(97.5~99):1:1:5:2:2:(50~80); and
   in step (b1), the internal mixing is performed at 100~120° C. for 10~20 min.

9. The method of claim 7, wherein in step (b2), the mixing is performed at 50-70° C.

10. The method of claim 7, wherein in step (b3), the standing is performed for 18-36 h; and the vulcanization is performed at 140~160° C. and 10~30 MPa for 10~30 min.

* * * * *